July 30, 1963 H. SCHWEICKERT ETAL 3,099,534

METHOD FOR PRODUCTION OF HIGH-PURITY SEMICONDUCTOR MATERIALS FOR ELECTRICAL PURPOSES

Original Filed June 11, 1957 2 Sheets-Sheet 1

United States Patent Office 3,099,534

Patented July 30, 1963

3,099,534

METHOD FOR PRODUCTION OF HIGH-PURITY SEMICONDUCTOR MATERIALS FOR ELECTRICAL PURPOSES

Hans Schweickert, Erlangen, and Konrad Reuschel, Pretzfeld, Germany, and Heinrich Gutsche, Danville, Pa., assignors to Siemens-Schuckertwerke Aktiengesellschaft, Berlin-Siemensstadt, Germany, a corporation of Germany Original application June 11, 1957, Ser. No. 665,086, now Patent No. 3,011,877, dated Dec. 5, 1961. Divided and this application Feb. 20, 1961, Ser. No. 90,291

Claims priority, application Germany June 25, 1956

9 Claims. (Cl. 23—208)

This application is a division of our copending application Serial No. 665,086, filed June 11, 1957, now Patent No. 3,011,877.

Our invention relates to the production of semiconductor materials, such as silicon, of highest purity for electrical purposes, such as for use in monocrystalline form in rectifiers, transistors, thermistors and other electrical semiconductor devices.

It is known to precipitate silicon from the gaseous phase by passing a gaseous mixture of hydrogen and silicon tetrachloride or silico-chloroform over a heated carrier, particularly a strip of tantalum. Silicon precipitates onto the tantalum strip on which it forms a covering crust of small thickness. The process is performed in an upwardly closed quartz cylinder whose open bottom end is sealed by a base plate. The base plate is traversed by electrodes which are connected exteriorly to the two poles of a voltage source, the ends of the tantalum strip being fastened to the electrodes in the interior of the quartz cylinder. Mounted between the electrodes in the cylinder is a supporting rod of silica extending parallel to the cylinder axis up to the vicinity of the closed top end. The middle of the tantalum strip rests upon the free end of the supporting rod so that the strip extends between the two electrodes in U-shaped configuration along the longitudinal direction of the cylinder. A pipe for the supply of fresh gas passes through the base plate into the interior of the cylinder and also extends nearly up to the other end.

For further processing of the product obtained with the aid of such a device, it is first necessary to remove the tantalum core from the silicon crust because otherwise the subsequent heat treatment, preferably zone melting, of the silicon would result in the formation of an alloy instead of a pure silicon monocrystal. The removal of the tantalum requires several intricate operations which entail the danger of introducing new impurities. Another disadvantage of the known device and method is the fact that the supporting silica rod, located between the two legs of the glowing tantalum strip, becomes heated up to approximately the same high temperature and hence is also coated with a silicon layer for which there is no further use.

If an attempt is made to substitute a silicon filament for the tantalum strip, to serve as a carrier for the crust to be precipitated, the filament, being fragile, tends to melt off during the first heating period. Difficulties arise if an attempt is made to mount, in the reaction vessel, a thin silicon rod. Since such a rod cannot readily be bent to U-shape, the supply of the electric heating current requires cumbersome and very large equipment because the current terminals must be located at a great distance from each other at the two opposite ends of the reaction vessel. This also causes difficulties when inserting and removing the charges.

It is an object of our invention to produce high-purity semiconductor materials in a greatly simplified, more convenient and more reliable manner.

To this end, and in accordance with a feature of our invention, we employ a method basically similar to the one described above in producing high-purity semiconductor material for electrical purposes, particularly silicon, by precipitating the semiconductor material from the gaseous phase onto a solid carrier heated by electric current. However, in distinction over the methods heretofore available, we use several carriers of the same semiconductor material as the one to be precipitated and make these carriers rod-shaped and sufficiently strong to be self-supporting. We further fasten one end of each carrier to a base structure and connect the fastened end of each rod to a pole of an electric current source, and we electrically interconnect the other ends of the rods so that current will pass serially from one or more rods through the interconnected ends and through the other rod or rods. The invention is suitable for producing high-purity silicon and silicon carbide. The semiconductor rods so produced can be further purified, for instance by repeated crucible-free zone melting, and can be converted into monocrystals suitable for the production of monocrystalline semiconductor members with asymmetrically conducting p-n junctions for the manufacture of diodes or triodes for communication (low-current) or power (high-current) purposes.

Two devices according to the invention are illustrated on the drawings by way of example, FIGS. 1 to 4 relating to the first embodiment and FIGS. 5 to 7 to the second embodiment. The figures are more particularly described as follows.

Figure 4:
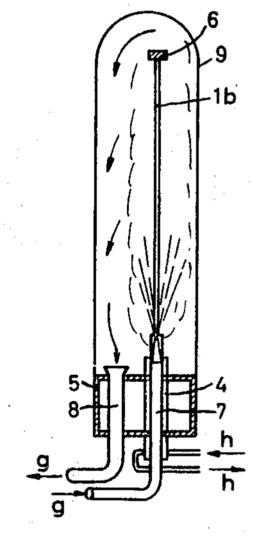
Figure 5:
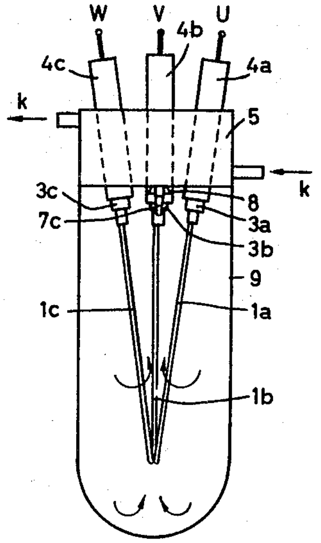
Figure 6:
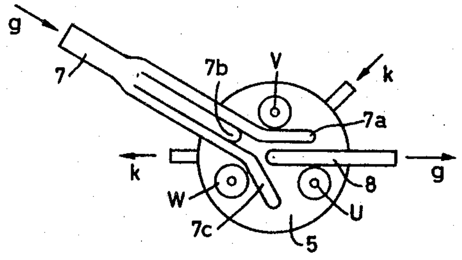

FIG. 4, a partly sectional side view of the processing device;

FIG. 5 is a front view of a processing device according to the second embodiment;

FIG. 6, a top view, and

Figure 7:
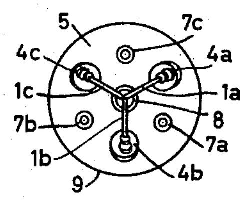

FIG. 7 is a bottom view of the base portion.

In the embodiment illustrated in FIGS. 1 to 4, the carrier rods or rod portions extend upwardly from the supporting base, whereas in the embodiment of FIGS. 5 to 7, the carrier rods are suspended from the base. Such a substantially vertical, or sharply inclined, arrangement of the rods has been found particularly favorable with respect to the design and use of the equipment. However, the method can also be carried out with the rods arranged in a horizontal or a less sharply inclined position. Similar components are denoted by the same respective reference characters in both groups of illustrations.

Figure 3:
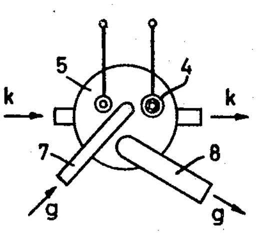
FIG. 3, is a bottom view of the base portion.
Figure 1:
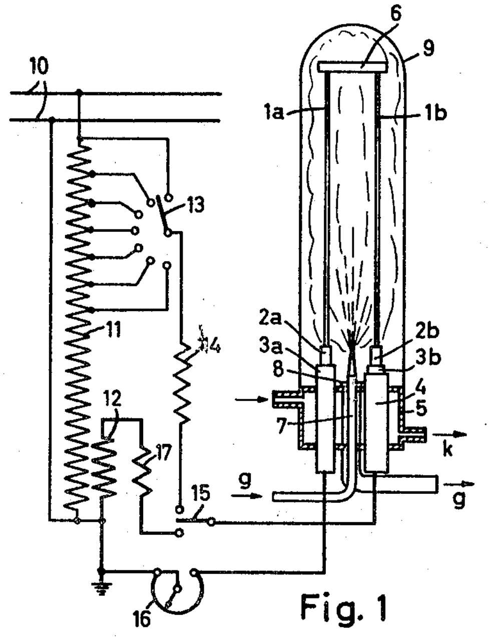
FIG. 1 shows an electric circuit diagram and illustrates, in a partly sectional front view, the processing device proper.

In FIG. 1, two thin silicon rods or rod sections or portions are denoted by **1*a* and 1*b*. The rods 1*a* and 1*b* may have a length of 0.5 m. and a diameter of 3 mm. Such rods remain self-supporting even in incandescent condition, such as at a temperature of 1100 to 1200° C. The lower ends of the silicon rods 1*a* and 1*b* are inserted into respective holders 2*a* and 2*b*** preferably consisting of graphite of highest purity, particularly the so-called "spectral carbon." Spectral carbon is obtainable in commerce in the form of rods of circular cross section and is normally used as electrodes for producing an arc for spectral analyses. Short pieces of such spectral carbon are provided at one front face with a slightly conical bore into which the end of a silicon rod can be pushed to firmly seat the rod in the holder. The holders may also be designed as clamps. For this purpose, the graphite rod at its bored end may be split in half over a suitable axial length, one-half remaining firmly joined with the body of the graphite rod whereas the other is severed from the rod by means of an incision perpendicular to the rod axis. The two halves, namely the fixed half and the loose half, form respective clamping jaws which are held together by a graphite ring, after the end of the silicon rod has been clamped between them.

Graphite holders 2a and 2b are pushed, in part, into metal pipes 3a and 3b, being firmly seated therein. The metal pipes are gas-tightly sealed in a common base structure 5, which may likewise consist of metal and is preferably made hollow, and is provided with stub pipes for the supply and discharge of a coolant such as water. The flow of coolant is indicated by arrows *k*. The metal pipe 3a may be directly soldered to the metallic base structure 5. This requires the insulating of the other metal pipe 3b by means of a sleeve 4 of electrically nonconducting material relative to the metallic base structure 5. The insulating sleeve 4 may consist, for example, of glass, porcelain or other ceramics, or of plastics. The metal pipes 3a and 3b must be gas-tightly sealed by a transverse wall or by a stopper, somewhere within the interior of the pipes, or at their lower end.

The silicon rods 1a and 1b may also be directly clamped in the respective metal pipes 3a and 3b, thus eliminating the carbon clamps or holders 2a and 2b. This, however, requires giving the silicon rod at the clamping ends a larger cross section than elsewhere, so that these clamping locations are not as strongly heated during the heat processing as the thinner rod portions.

The carrier rods 1a and 1b extend parallel to each other so that their free ends do not touch. These ends are conductively connected with each other by a bridge 6 of high-purity graphite. This bridge 6 also consists preferably of spectral carbon. It may be provided with bores engaging the upper ends of the respective rods 1a and 1b.

The base structure 5 also accommodates an inlet pipe 7 for the gaseous reaction mixture from which the semiconductor material is precipitated. The upper end of the inlet tubes 7 is nozzle shaped, and causes the fresh gas mixture to enter into the reaction space in turbulent flow as a free jet. During the precipitating process, the nozzle must not be heated up to the reaction temperature. This is necessary in order to prevent the reaction from taking place within the nozzle, which would have the result that silicon deposited at the inner nozzle walls would narrow, or even clog, the nozzle opening. The tip of the nozzle is therefore mounted below the upper ends of the carbon holders 2a and 2b. The jet of gas travels from the fastening points of the carrier rods in the longitudinal direction of the rods. The inlet pressure of the fresh gas mixture can be so adjusted that the rods 1a and 1b are flooded with fresh gas along their entire length. The gas leads through an outlet tube 8 which is likewise inserted into the base structure 5 and is gas-tightly sealed relative thereto. The gas inlet and the gas outlet are identified in FIG. 3 by arrows *g*. A transparent bell 9 of glass or quartz is gas-tightly sealed and fastened on the base structure 5, and encloses the reaction space.

The electric leads for supplying the heating current are connected to the metal pipes 3a and 3b. Since the silicon rods 1a and 1b have a very high electric resistance when cold, amounting to a multiple of the resistance in incandescent condition, there are preferably provided two sources of heating current. One is for high voltage to product heating at low current intensity. The second is a source of low voltage for continuous operation at high current intensity during the depositing process proper. Accordingly, FIG. 1 shows a high-voltage line 10 to which the primary winding 11 of a transformer is connected. A controllable voltage can be taken from the primary winding 11 by means of taps and a selector switch 13. The tapped-off voltage can be controllably applied to the metal tube 3b, during the heating-up period, by means of the selector switch 13 which is in series with a stabilizing impedance 14 and a switch 15. The metal pipe 3a is connected through a control rheostat 16 with the grounded end of the transformer winding 11. During the heating-up period, the voltage can be varied by means of the selector switch 13 in such manner that the heating current does not become larger than two amperes. When the silicon rods have reached glowing red condition, the voltage is reduced by means of switch 13 so that the switch 15 can be switched over to supply voltage from the secondary transformer winding 12, which is rated for low voltage and high current intensity. For stabilization, the low-voltage circuit of winding 12 is provided with an impedance 17. By means of the control rheostat 16, the current is increased until the silicon rods 1a and 1b have reached a temperature of about 1150° C., which has been found to be most favorable for the performance and economy of the process. The temperature is indicated by the glowing color of the rods and is kept constant for the duration of the process. This requires a continuous and gradual increase of the current, regulated by means of rheostat 16, due to the fact that the resistance of the rods decreases with increasing thickness.

Figure 2:
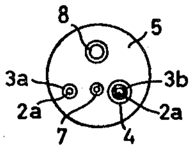
FIG. 2 is a top view of the base portion of the processing device.

The arrangement of the rod holders, the gas inlet and the gas outlet are apparent from FIG. 2. The path of the gas flow within the reaction space is schematically indicated in FIG. 4 by curved arrows. Also shown in FIG. 4 and denoted by arrows *h* is a coolant circulation for the insulated metal pipe 3b. The interior of pipe 3b is traversed by a flow of coolant, water for example, which passes through insulating tubing, comprising glass tubes and hoses of insulating material. The insulation of the coolant circulation system must either be sufficient for the high voltage used during the heating-up period, or care must be taken that the coolant circulation system is inactive during the heating-up period and safety devices provided so that it can be made active only during continuous processing with low voltage.

Instead of providing a single pair of rods, any desired larger number of rods, even or odd, may be arranged within a single reaction space. While in the illustrated example, the electric heating current passes serially through the two rods, any desired number of rods may be connected in parallel to a single pole of the heating circuit, and the numbers of rods thus parallel connected to a single pole may differ from the number of rods connected to the other pole. Depending upon the number of rods to be processed simultaneously, the bridge member 6 may have lateral arms or may be given a cross- or star-shaped design, preferably so disposed that the ends touch the walls of the bell 9 in order to brace the upper rod ends in lateral direction.

The device illustrated in FIGS. 5 to 7 is provided with three carrier rods or rod portions 1a, 1b, 1c suitable for connection to three-phase alternating current supplied to the terminals U, V, W. The connecting pipes 3a, 3b, 3c are all surrounded by respective insulating jackets 4a, 4b, 4c and are inserted into a common metallic base structure 5 in such a manner that the carrier rods 1a, 1b, 1c are suspended downwardly and are inclined towards each other to make their free ends touch each other. This makes it unnecessary to provide a separate current-conducting connection since the rods or rod portions, during the heating-up operation, will fuse together at the point of mutual contact. As is apparent from the top view, FIG. 6, and the bottom view, FIG. 7, of the base structure 5, this device is provided with three inlet pipes 7a, 7b, 7c for the fresh gas. The inlet nozzles are uniformly distributed, on the periphery of a circle, between the rod holders. The gas outlet pipe 8 passes through the base structure 5 on the center axis of the device, so that the arrangement within the bell 9 is completely symmetrical. The path of the gas flow is indicated in FIG. 5 by curved arrows.

It is further understood that the gaseous mixture employed may be a mixture of hydrogen and silicon tetrachloride or silico-chloroform when silicon is being precipitated, or any other gas or gaseous mixture capable of reaction or decomposition to produce silicon.

Another example is the production of silicon carbide (SiC) from monomethyltrichlorsilane ($CH_3SiCl_3$), employing hydrogen as carrier gas and reducing agent. In this case, the reaction temperature is preferably between 1300° and 1400° C. approximately. A carrier rod of silicon carbide is used in the latter case, produced from a thicker rod by sawing it parallel to the rod axis. At the higher melting temperature of silicon carbide, there occurs a dissociation into the components, the silicon being evaporated out of the material. However, the carrier rod may also consist of pure carbon. This carbon core can later be removed by mechanical means, if necessary. Also suitable as starting materials for the production of silicon carbide are mixtures of silicon-halogen compounds with hydrocarbons, an addition of hydrogen gas being employed as carrier gas and reducing agent. As examples, we employ the mixtures:

$$(SiCl_3H+C_6H_{12})+H_2$$

or $$(SiCl_3H+CCl_3H)+H_2$$

The most favorable reaction temperatures are between the approximate limits of 1300 and 1400° C.

Essential for the economy of the method is the proper choice of the molar ratio MV, which is defined as the number of moles of the compound containing the semiconductor substance, with respect to the number of moles of the hydrogen being used. This molar ratio is to be chosen differently for different mixtures of substances. When producing silicon from $SiCl_3H$, this ratio is between 0.015 and 0.3, preferably between 0.03 and 0.15.

If these limits are observed, an excessive hydrogen consumption on the one hand, and an excessive consumption of $SiCl_3H$ on the other hand, are avoided. Within the above-mentioned narrower range, there is achieved a yield of silicon between 20% and 40%, calculated in relation to the total quantity of silicon contained in the starting substances.

When producing silicon from $SiCl_4$, the molar ratios are preferably chosen between 0.01 and 0.2, with particular preference to the range between 0.015 and 0.10. In this medium range, a production of silicon between about 8% and about 30% is obtainable.

The term decomposition is used in the generic sense, being inclusive of reduction and dissociation.

It will be obvious to those skilled in the art, upon a study of this disclosure, that processing devices according to the invention can be modified in various ways and may be embodied in equipment other than particularly illustrated and described herein, without departing from the essential features of our invention and within the scope of the clams annexed hereto.

We claim:

1. A process for producing a silicon body by reaction of a gas mixture of hydrogen and silicon tetrachloride in a reaction chamber, comprising heating a silicon member in the chamber at least to glowing temperature but below the melting point of silicon, the hot member effecting the reaction, introducing a high velocity jet of the said gas mixture into the chamber to produce a high degree of turbulence to effect efficient reaction into silicon, the latter forming said silicon body on the silicon member, the molar ratio of the silicon tetrachloride with respect to the hydrogen ranging from 0.01:1 to 0.2:1.

2. A process for producing a silicon body by thermal decomposition and reduction of a gas mixture of hydrogen and silicon hydrogen trichloride in a reaction chamber, comprising heating a silicon member in the chamber at least to glowing temperature but below the melting point of silicon, the hot member effecting the decomposition and reduction, introducing a high velocity jet of the said gas mixture into the chamber to produce a high degree of turbulence to effect efficient decomposition and reduction into silicon, the latter depositing on the silicon member to form said silicon body, the molar ratio of the silicon hydrogen trichloride with respect to the hydrogen ranging from 0.015:1 to 0.3:1.

3. A process for producing a body of a semiconductor material from the group consisting of silicon and silicon carbide by reaction of a gas mixture of hydrogen and a chlorinated monosilane of the type $SiCl_nR_{4-n}$, where "$n$" designates an integer between 1 and 4 and "R" is selected from the group consisting of H and $CH_3$, in a reaction chamber, comprising heating a member consisting of said semiconductor material in the chamber at least to glowing temperature but below the melting point of said semiconductor material, the hot member effecting the reaction, introducing a high velocity jet of said gas mixture into said chamber to produce a high degree of turbulence to effect efficient reaction into said semiconductor material, the latter forming said body on said member, the molar ratio of the chlorinated monosilane with respect to the hydrogen ranging from 0.01:1 to 0.3:1.

4. A process for producing silicon semiconductor material of high purity for electrical purposes by decomposition of silicochloroform and hydrogen, which comprises heating a silicon carrier body at least to glowing temperature but below the melting point of said carrier body, and contacting said carrier body with a mixture of silicon hydrogen trichloride and hydrogen at a molar ratio of silicon hydrogen chloride to hydrogen from about 0.03:1 to about 0.15:1, thereby depositing silicon material onto said carrier.

5. A process for producing silicon semiconductor material of high purity for electrical purposes by decomposition of silicon tetrachloride and hydrogen, which comprises heating a silicon carrier body at least to glowing temperature but below the melting point of said carrier body, and contacting said carrier body with a mixture of silicon tetrachloride and hydrogen in a molar ratio of silicon tetrachloride to hydrogen from about 0.015:1 to about 0.10:1, thereby depositing silicon material onto said carrier.

6. A method for producing silicon carbide semiconductor material of high purity for electronic purposes, which comprises heating a carrier body of silicon carbide at a temperature between about 1300 and 1400° C. and contacting said carrier body with a mixture of monomethyltrichlorsilane and hydrogen, thereby precipitating silicon carbide on said carrier.

7. A method for producing silicon carbide semiconductor material of high purity for electronic purposes, which comprises heating a carrier body of carbon at a temperature between about 1300 and 1400° C. and contacting said carrier body with a mixture of siliconhalogenide, hydrocarbon and hydrogen, thereby precipitating silicon carbide on said carrier.

8. A process for producing silicon semiconductor material of high purity for electrical purposes by decomposition of silicon hydrogen trichloride and hydrogen, which comprises heating a silicon body at least to glowing temperature but below the melting point of said silicon body, and contacting said carrier body with a turbulent mixture of silicon hydrogen trichloride and hydrogen, the molar ratio of silicon hydrogen chloride to hydrogen ranging from about 0.015:1 to 0.3:1, thereby depositing silicon material onto said body.

9. A process for producing silicon semiconductor material of high purity for electrical purposes by decomposition of silicon tetrachloride and hydrogen, which comprises heating a silicon body at least to glowing temperature but below the melting point of said silicon body, and contacting said carrier body with a turbulent mixture of silicon tetrachloride and hydrogen, the molecular ratio of silicon tetrachloride to hydrogen ranging from about 0.01:1 to 0.2:1, thereby depositing silicon material onto said silicon body.

References Cited in the file of this patent

UNITED STATES PATENTS

| | | |
|---|---|---|
| 2,438,892 | Becker | Apr. 6, 1948 |
| 2,763,581 | Freedman | Sept. 18, 1956 |
| 2,895,858 | Sangster | July 21, 1959 |
| 2,904,404 | Ellis | Sept. 15, 1959 |

OTHER REFERENCES

Sangster: Article, "Journal of the Electrochemical Society," May 1957, pages 317–319.